(12) United States Patent
Kang

(10) Patent No.: US 9,568,044 B2
(45) Date of Patent: Feb. 14, 2017

(54) MOTOR DRIVEN POWER STEERING SYSTEM

(71) Applicant: HYUNDAI MOBIS CO., LTD., Seoul (KR)

(72) Inventor: Won Ho Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 2 days.

(21) Appl. No.: 14/705,356

(22) Filed: May 6, 2015

(65) Prior Publication Data

US 2015/0360719 A1 Dec. 17, 2015

(30) Foreign Application Priority Data

Jun. 11, 2014 (KR) ........................ 10-2014-0070758

(51) Int. Cl.
| | | |
|---|---|---|
| *F16C 27/06* | (2006.01) | |
| *B62D 7/22* | (2006.01) | |
| *F16H 57/021* | (2012.01) | |
| *B62D 5/04* | (2006.01) | |
| *F01D 25/16* | (2006.01) | |
| *F16H 57/00* | (2012.01) | |

(52) U.S. Cl.
CPC .............. *F16C 27/06* (2013.01); *B62D 5/0409* (2013.01); *F01D 25/164* (2013.01); *F16H 57/0006* (2013.01); *F16H 57/021* (2013.01); *F16H 2057/0213* (2013.01)

(58) Field of Classification Search
CPC ......... F16C 27/06; F16C 27/066; F16C 33/04; F16C 2326/24; F16C 2361/61; F16C 2380/27; B62D 3/304; B62D 5/0409; B62D 5/0421; B62D 7/22; F16H 57/021; F16H 2057/0213; F01D 25/164; F01D 25/166
USPC ....... 384/215, 220, 222, 275–276, 283, 296, 384/536, 581–582; 74/492, 498
See application file for complete search history.

(56) References Cited

U.S. PATENT DOCUMENTS

| | | | | |
|---|---|---|---|---|
| 5,669,718 A | * | 9/1997 | Sakairi .................. | F16C 27/063 384/215 |
| 5,675,456 A | * | 10/1997 | Myers .................. | G11B 21/083 360/265.6 |
| 6,550,567 B2 | * | 4/2003 | Murakami ........... | B62D 5/0409 180/444 |
| 7,665,747 B2 | * | 2/2010 | Arlt .......................... | B62D 3/12 280/93.514 |
| 7,686,515 B2 | * | 3/2010 | Schust ..................... | B62D 3/12 384/215 |
| 8,127,639 B2 | * | 3/2012 | Manwaring ........... | F16C 33/201 280/777 |

(Continued)

FOREIGN PATENT DOCUMENTS

| | | | | |
|---|---|---|---|---|
| DE | 102008009107 A1 | * | 8/2009 | .......... B62D 5/0409 |
| JP | 2008296626 A | * | 12/2008 | |

(Continued)

*Primary Examiner* — Marcus Charles
(74) *Attorney, Agent, or Firm* — Knobbe Martens Olson & Bear LLP

(57) ABSTRACT

A motor driven power steering system includes a worm shaft, a bearing installed on the worm shaft, and a bearing bush enclosing the bearing. The bearing bush includes a bearing guide enclosing the bearing and a damper which is mounted on an outer side surface of the bearing guide and absorbs vibrations of the worm shaft. The bearing guide and the damper are integrally formed by injection molding.

11 Claims, 5 Drawing Sheets

(56) References Cited

U.S. PATENT DOCUMENTS

| | | | | |
|---|---|---|---|---|
| 8,418,583 | B2* | 4/2013 | Oki | B62D 3/12 |
| | | | | 384/276 |
| 8,549,945 | B2* | 10/2013 | Rho | B62D 5/0409 |
| | | | | 384/256 |
| 8,667,858 | B2* | 3/2014 | Fuechsel | B62D 5/0409 |
| | | | | 384/535 |
| 8,827,558 | B2* | 9/2014 | Heintschel | B62D 1/185 |
| | | | | 384/16 |
| 8,845,195 | B2* | 9/2014 | Gaisser | F16C 23/04 |
| | | | | 384/215 |
| 2004/0076353 | A1* | 4/2004 | Kubota | B62D 1/16 |
| | | | | 384/276 |
| 2010/0239199 | A1* | 9/2010 | Nakagawa | B62D 5/0409 |
| | | | | 384/283 |
| 2010/0260448 | A1* | 10/2010 | Hafermalz | B62D 3/12 |
| | | | | 384/215 |
| 2012/0125650 | A1* | 5/2012 | Koch | B25D 17/24 |
| | | | | 173/211 |
| 2014/0083794 | A1* | 3/2014 | Ishii | B62D 5/0409 |
| | | | | 180/444 |

FOREIGN PATENT DOCUMENTS

| | | | |
|---|---|---|---|
| JP | 5251001 B2 | * | 7/2013 |
| JP | 2013204740 A | * | 10/2013 |
| KR | 10-2009-0082821 A | | 7/2009 |

* cited by examiner

MOTOR DRIVEN POWER STEERING SYSTEM

CROSS-REFERENCE TO RELATED APPLICATION

The present application claims priority under 35 U.S.C. §119(a) to Korean Patent Application No. 10-2014-0070758, filed on Jun. 11, 2014, in the Korean Intellectual Property Office, which is incorporated herein by reference in its entirety.

BACKGROUND

1. Technical Field

Embodiments of the present disclosure relate to a motor driven power steering system, and more particularly, to a motor driven power steering system which prevents floating and thereby absorbs shocks by covering a bearing installed on a worm shaft from the outside and at the same time enclosing the bearing.

2. Related Art

Generally, an electric power steering system, i.e., a motor driven power steering system (MDPS) is a system which assists a steering power with a motor power, not using a hydraulic pressure. To this end, the MDPS transmits a rotation force of a worm wheel to a gearbox to thereby assist a steering torque by having a motor which generates power under the control of an Electronic Control Unit (ECU), and a worm shaft which is rotated by a motor and the worm wheel in mesh therewith.

As described above, the MDPS uses the worm shaft and the worm wheel in mesh with each other, and therefore metallic noises, i.e., rattle noises occur as a result of a gap between gear teeth due to the abrasion of gear teeth and other various factors. Therefore there is a need of improvement.

The background technology is disclosed in Korean patent application publication No. 2009-0082821 under the title "a column assist type electric power steering system", published on Jul. 31, 2009.

SUMMARY

An aspect of the present disclosure is to provide a motor driven power steering system which prevents floating by covering a bearing installed on a worm shaft from the outside and at the same time enclosing the bearing.

A motor driven power steering system according to one embodiment includes a worm shaft; a bearing installed on the worm shaft; and a bearing bush enclosing the bearing, wherein the bearing bush includes a bearing guide enclosing the bearing; and a damper which is mounted on an outer side surface of the bearing guide and absorbs vibrations of the worm shaft and wherein the bearing guide and the damper are integrally formed by injection molding.

In a further embodiment, the damper includes elastically deformable material to be able to absorb vibrations from the worm shaft.

In another embodiment, the damper includes rubber material.

In a further embodiment, the bearing guide includes a damper mounting portion which has an annular column shape and on which the damper is mounted; a stopper formed to protrude at one end of the damper mounting portion in the direction of outer circumference of the damper mounting portion; and a plug formed to protrude at the other end of the damper mounting portion in the direction of outer circumference of the damper mounting portion.

In yet another embodiment, the stopper has an outer diameter larger than that of the damper mounting portion such that the damper is not detached from the damper mounting portion.

In a further embodiment, the damper is adapted to surround the whole outer circumferential surface of the damper mounting portion.

In a further embodiment, the damper mounting portion, the stopper and the plug are integrally formed by injection molding.

In a further embodiment, a plurality of groove portions are formed on an outer circumferential surface of the damper.

In a further embodiment, the groove portions are formed in such a manner that the length in the width direction of the damper is longer than that in the circumferential direction thereof.

In a further embodiment, a plurality of hole portions are formed on the outer circumferential surface of the damper.

According to the embodiment, the motor driven power steering system may absorb shocks and reduce noises by covering the bearing installed on the worm shaft from the outside and at the same time enclosing said bearing, thereby preventing floating and by having the bearing bush including elastic deformable material.

In addition, according to the embodiment, the ride comfort of the vehicle may be improved as a result of vibration and noise reduction.

Further, according to the embodiment, the bearing guide and the damper may be assembled at a time by a double injection process. Therefore, the simplification of the assembly process and the cost reduction of the article may be attained.

DETAILED DESCRIPTION

Figure 1:
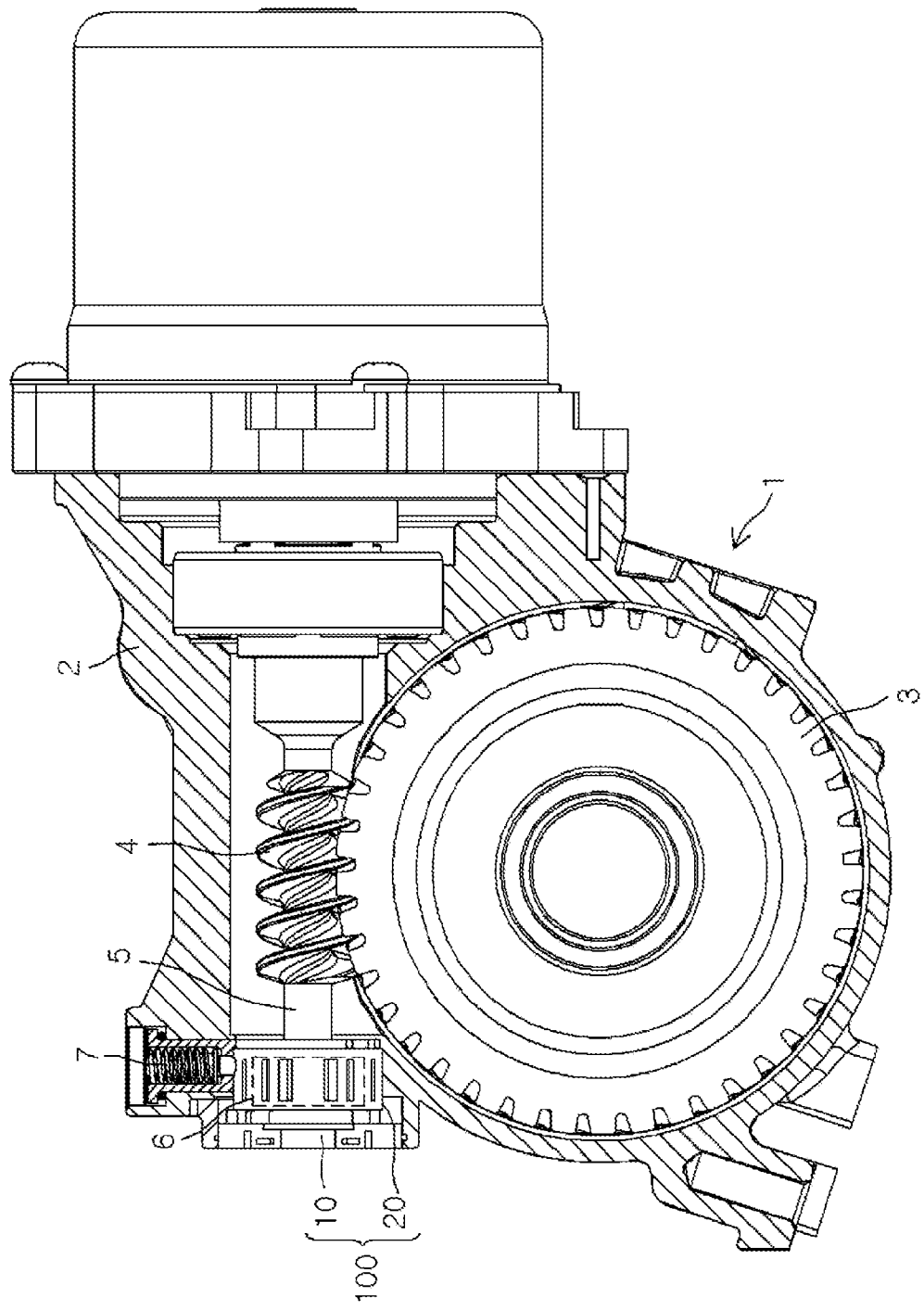
FIG. 1 illustrates a schematic cross-section view of a motor driven power steering system in which a bearing bush is mounted according to one embodiment of the present disclosure.

Hereinafter, a motor driven power steering system according to one embodiment will be described below with reference to the accompanying drawings. In this description the thickness of lines and the dimension of the elements, etc. illustrated in the drawings may be exaggerated for clarity of the description and for the convenience. In addition, the terms described below are defined having regard to the function thereof in the present disclosure and may become different depending on a user, the user's intent or the practice. Thus, the definition of these terms should be made based on contents throughout the specification.

Figure 2:
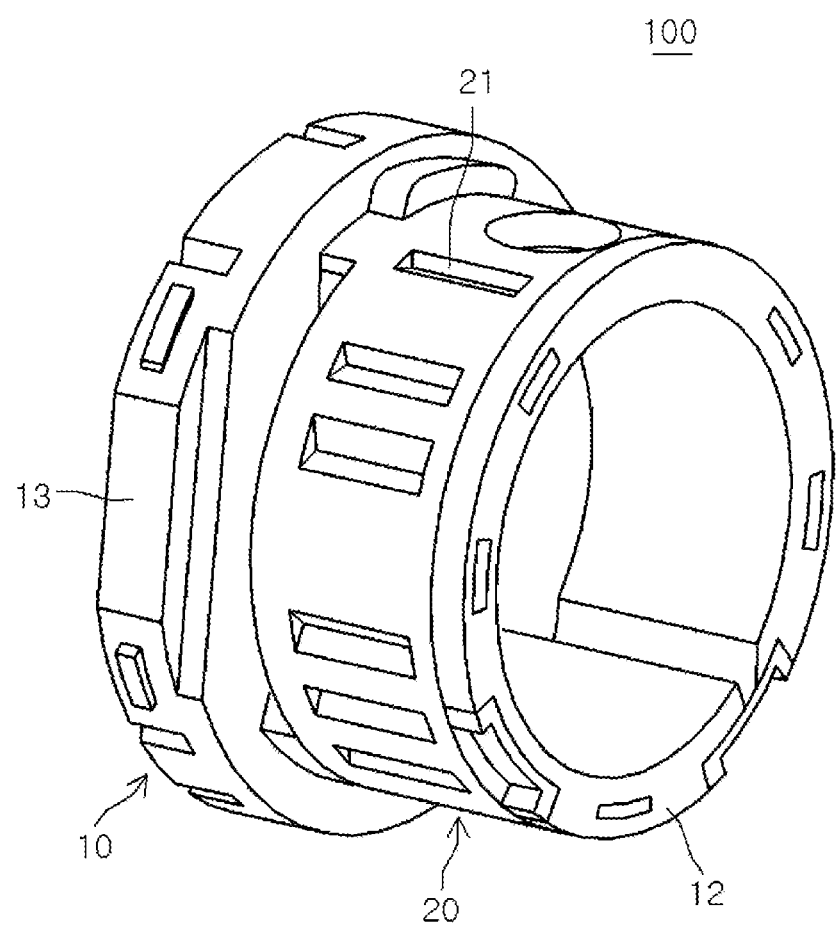
FIG. 2 illustrates a schematic perspective view of a bearing bush according to one embodiment of the present disclosure.
Figure 3:
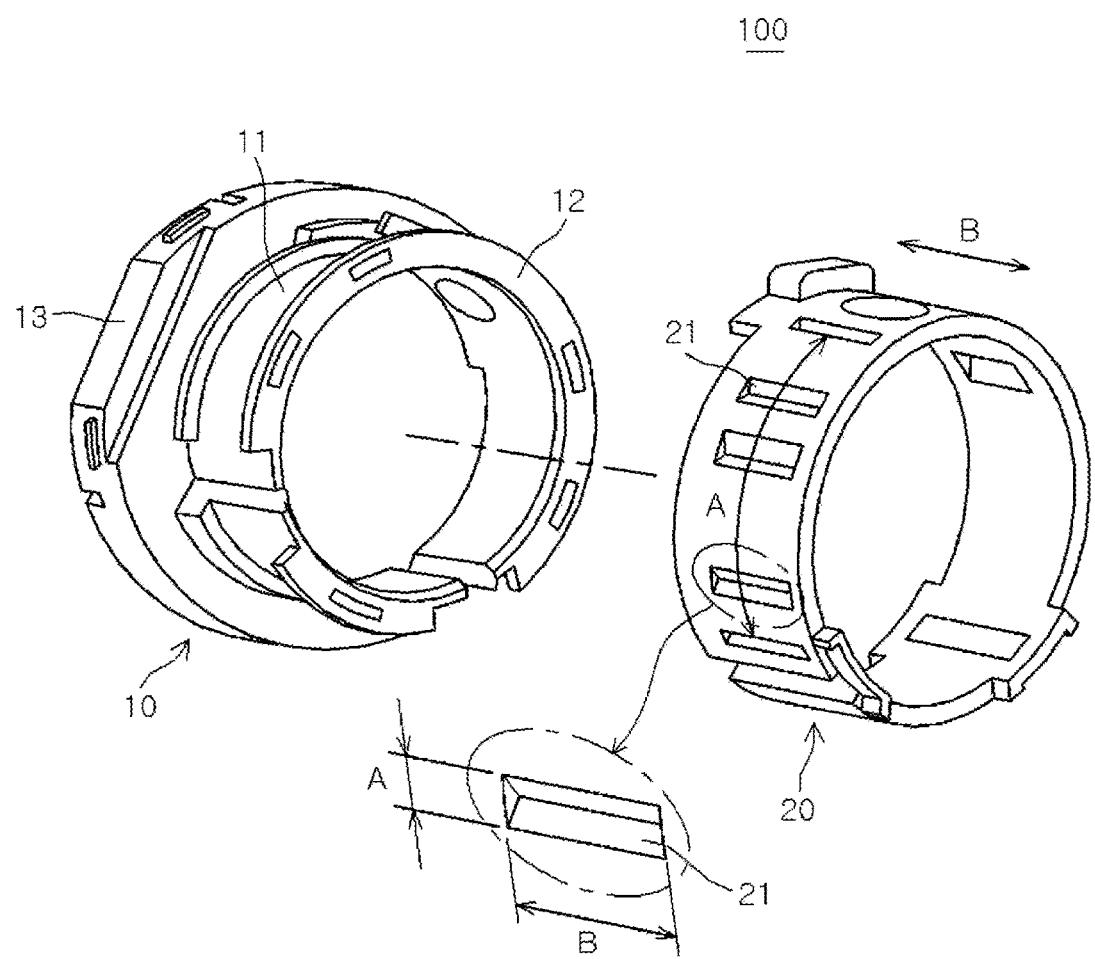
FIG. 3 illustrates a schematic exploded perspective view of a bearing bush according to one embodiment of the present disclosure.
Figure 4:
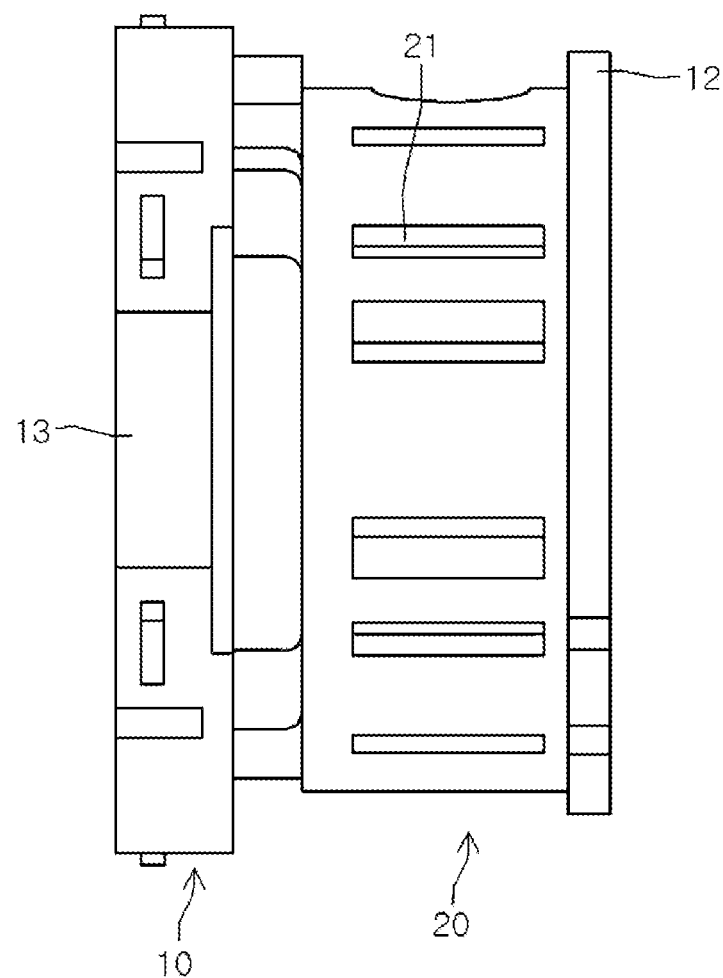
FIG. 4 illustrates a schematic side view of a bearing bush according to one embodiment of the present disclosure.
Figure 5:
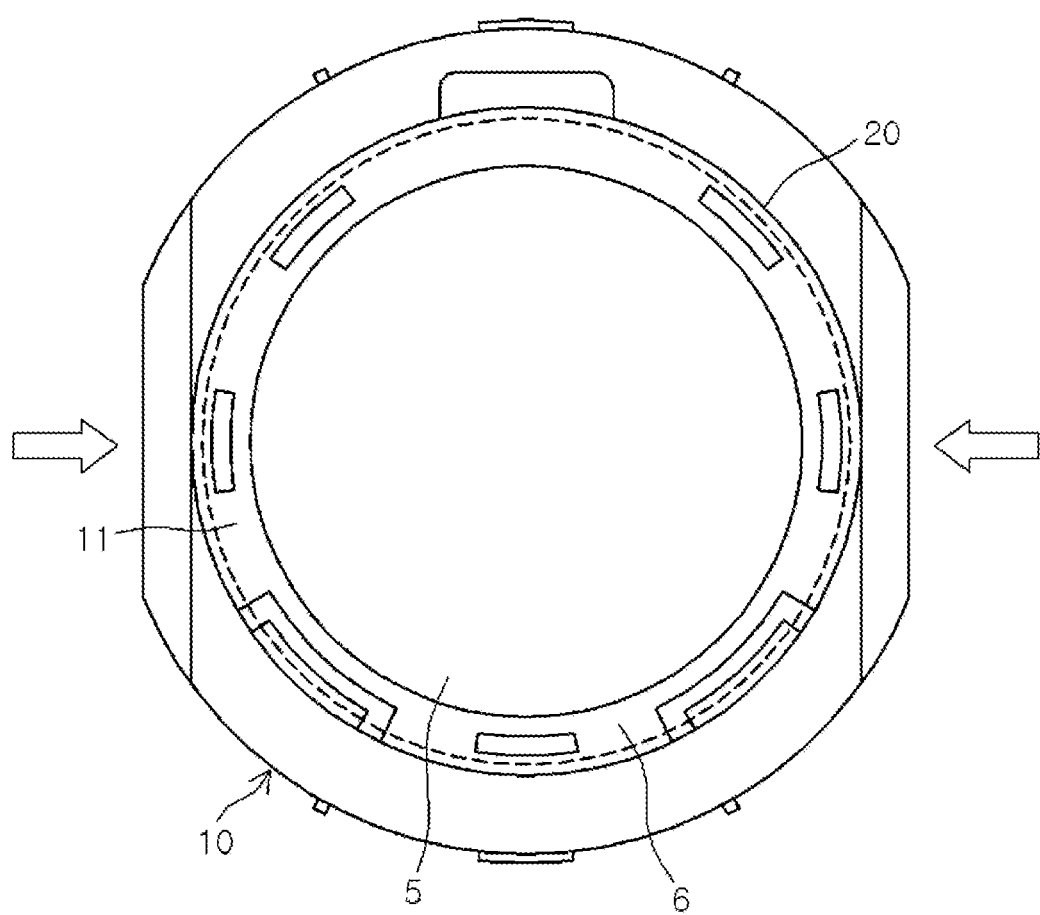
FIG. 5 illustrates a schematic front view of a bearing bush according to one embodiment of the present disclosure.

FIG. 1 illustrates a schematic cross-section view of a motor driven power steering system in which a bearing bush is mounted according to one embodiment of the present disclosure. FIG. 2 illustrates a schematic perspective view of a bearing bush according to one embodiment of the present disclosure. FIG. 3 illustrates a schematic exploded perspective view of a bearing bush according to one embodiment of the present disclosure. FIG. 4 illustrates a schematic side view of a bearing bush according to one embodiment of the present disclosure. FIG. 5 illustrates a schematic front view of a bearing bush according to one embodiment of the present disclosure.

Referring to FIG. 1, a bearing bush 100 according to one embodiment of the present disclosure is mounted in a motor driven power steering system 1.

The motor driven power steering system 1 includes the bearing bush 100 which is intended for preventing floating and securing rattle properties by enclosing a bearing 6 installed on one end of a worm shaft 5 of a worm 4.

Allowing for assembleability and productivity, the less the number of the components which constitute the motor driven power steering system 1 is, the more favorable a worm wheel 3, a worm 4, a worm shaft 5 and a bearing bush 100, etc. installed in a narrow space within a housing 2 are. An antirattle mechanism 7 is intended for solving rattle noises in the motor driven power steering system 1 wherein the antirattle mechanism prevents rattle noises by pressurizing towards the worm wheel 3 the bearing 6 installed on one end of the worm shaft 5 using a spring.

Referring FIGS. 2 and 3, the bearing bush 100 according to one embodiment of the present disclosure includes a bearing guide 10 and a damper 20.

The bearing guide 10 serves to enclose the bearing 6 installed on one end of the worm shaft 5 and guide the movement of the bearing 6 at the time of tilting of the worm shaft 5. The bearing guide 10 includes a damper mounting portion 11, a stopper 12 and a plug 13.

The damper mounting portion 11 is formed of an annular shape and is a portion which forms an outer side surface of the bearing guide 10. On the outer side surface of the damper mounting portion 11 is mounted the damper 20. The damper 20 in the embodiment surrounds the entire side surface of the damper mounting portion 11. Like this, since the contact area of the damper 20 and the damper mounting portion 11 is wide, sensitivity to deformation is small and transmission of vibrations and noises through the damper mounting portion 11 to the damper 20 is easy. Therefore, vibrations and noises may be rapidly absorbed.

The stopper 12 is formed to protrude at one end of the damper mounting portion 11 (referring to FIG. 3, the end of the right side) in the direction of outer circumference of the damper mounting portion 11. Since the damper mounting portion 11 is formed of an annular shape, the stopper 12 also generally protrudes in an annular shape. The stopper 12 is formed to have an outer diameter larger than that of the damper mounting portion 11. Thus, the damper 20 mounted on the damper mounting portion 11 is prevented from being detached from the damper mounting portion 11.

The plug 13 is formed to protrude at the other end of the damper mounting portion 11 (Referring to FIG. 3, the end of the left side) in the direction of outer circumference of the damper mounting portion 11. Since the damper mounting portion 11 is formed of an annular shape, the plug 13 also protrudes approximately in an annular shape. The plug 13 is formed to have an outer diameter larger than that of the stopper 12. Therefore, the bearing guide 10 has the size of an outer diameter in the order of the plug 13, the stopper 12, and the damper mounting portion 11.

The plug 13 serves to block the bearing 6 from the outside, thereby preventing foreign matter, etc. from the outside from entering the bearing 6 and preventing fracture of the bearing 6 wherein the bearing 6 is surrounded by the damper mounting portion 11.

The stopper 12 and the plug 13 are formed integrally with the damper mounting portion 11. That is, the damper mounting portion 11, the stopper 12 and the plug 13 may be integrally formed by injection molding. That is, the stopper 12 and the plug 13 are formed integrally with the damper mounting portion 11. Therefore, the assembly process of the bearing guide 10 is simplified. Thus productivity is enhanced and assembly convenience is improved. In addition, differently from the fact that the stopper 12 and the plug 13 are separately installed on the damper mounting portion 11, the bearing guide 10 is manufactured in one process. Therefore, the number of the installation components decreases and thus the reduction of process cost and production cost may be fulfilled.

The damper 20 is mounted on the damper mounting portion 11, that is, the outer circumferential surface formed along the circumferential direction A of the bearing guide 10. The damper 20 also absorbs vibrations generated from the worm shaft 5. The damper 20 includes elastic deformable material.

The damper 20 surrounds the entire outer side surface of the damper mounting portion 11 from one end of the damper mounting portion 11 (referring to FIG. 2, the end of the left side) which is connected to the plug 13 up to the other end of the damper mounting portion 11 (referring to FIG. 2, the end of the right side) which is connected to the stopper 12. Since the damper 20 encloses the entire surface of the damper mounting portion 11, the transmission of vibrations and noises through the damper mounting portion 11 to the damper 20 may be accomplished more rapidly and in a wider range. For this reason, the reduction of vibrations and noises through the damper 20 may be rapidly accomplished within a short time.

The damper 20 is made of elastic deformable material and may thus absorb vibrations and noises according to floating of the worm shaft 5. Therefore, excellent ride comfort may be provided to a rider of the vehicle. The damper 20 is elastic deformable material and may be made of rubber, silicone, resin, etc. According to one embodiment of the present disclosure the damper 20 includes rubber material. Since the damper 20 is made of rubber material, the damper 20 is installed tightly on the outer side surface of the bearing guide 10 and an excellent elastic force is thus provided in an inexpensive manner to the bearing guide 10. Therefore, vibrations may be reduced and noises may be absorbed.

On the outer side surface of the damper 20 are formed a plurality of groove portions 21. Each of the groove portions 21 may have a cross section of triangle shape (see FIG. 3) or of semicircular shape. The groove portions 21 are formed such that the damper 20 may be elastically deformed but are not limited to the above illustration.

The groove portions 21 are formed in plurals on the outer circumferential surface of the damper 20 along the circumferential direction A. Since a plurality of groove portions 21 are formed on the outer circumferential surface of the damper 20, the groove portions 21 may absorb vibrations and noises while they are elastically deformed in case vibrations and noises due to floating of the worm shaft 5 are generated. On the outer circumferential surface of the damper 20, besides a recessed structure of a certain depth such as the groove portions 21, a plurality of hole portions may be formed in a certain size.

Referring to FIGS. 4 and 5, the groove portions 21 are formed on the outer circumferential surface of the damper 20 and are formed such that the length in a width direction B is longer than that in a circumferential direction A. Therefore, in case the damper 20 is assembled to the bearing guide 10, the damper 20 may be compressed in a horizontal direction and assembly may thus be easily performed. And at the time of vibration generation, the absorption rate of vibrations and noises may be enhanced while the groove portions 21 may be easily compressed or expanded.

The bearing guide 10 and the damper 20 in the embodiment of the present disclosure may be integrally formed by injection molding. The bearing guide 10 is first molded. The damper 20 is formed on a damper mounting portion 11 while the axis of the molded bearing guide 10 is rotated. At this time, the bearing guide 10 is molded of resin and the damper 20 is molded of resin including rubber material, etc. or of rubber material.

The bearing guide 10 and the damper 20 may be made in an integral form by a double injection process. Thus, the bearing guide 10 and the damper 20 are molded at a time to be made as one integral part. Therefore, the assembly process is simplified and the productivity is thus improved. In addition, assembly convenience is improved and mass production is easily accomplished.

In addition, as the damper 20 encloses the entire outer side surface of the damper mounting portion 11, the deformation of the damper 20 and/or the damper mounting portion 11 is prevented at the time of a double injection process. And the sensitivity to deformation is low and the absorption of vibrations and noises is accomplished through the entire surface of the damper 20.

The operation of the motor driven power steering system 1 comprising the above described elements will be as follows:

According to the driving of the motor due to the operation of the vehicle, a worm 4 and a worm wheel 3 in mesh therewith are rotated. At this time, as the worm 4 and the worm wheel 3 are rotated, the gear teeth thereof each other are abraded and metallic noises, i.e., rattle noises and vibrations according to the gap of gear teeth may be generated. On one end of the worm 4 (referring to FIG. 1, the end of the left side) is formed the worm shaft 5 and on the worm shaft 5 is installed the bearing 6.

The bearing guide 10 which encloses the bearing 6 installed on one side of the worm shaft 5 fixes the position of the bearing 6 by holding the movement of the bearing 6. At this time, the damper 20 mounted on the damper mounting portion 11 of the bearing guide 10 absorbs vibrations and noises transmitted to the bearing guide 10.

The groove portions 21 of the damper 20 absorb vibrations and noises while they are compressed and expanded according to vibrations transmitted to the damper 20. Thus, noises within the motor driven power steering system 1 are reduced. Therefore, the transmission of the noises to a rider of the vehicle is blocked or reduced. Thus, the driving or riding convenience may be improved.

The present disclosure is described with reference to one embodiment illustrated in the drawings. However, this description is only illustrative and it would be understood that those skilled in the art may make various modifications and equivalent other embodiments from this.

What is claimed is:

1. A motor driven power steering system comprising:
   a worm gear integrated with a shaft extending along an axis; and
   a bearing bush comprising a bearing guide and a damper;
   the bearing guide comprising a first ring-shaped wall extending along and around the axis with a first opening and a second opening at two opposing ends thereof in the axis, the first ring-shaped wall configured to receive a distal end portion of the shaft through the first opening, the first ring-shaped wall having a first through hole;
   the damper comprising a second ring-shaped wall formed on and surrounding an outer circumferential surface of the first ring-shaped wall such that the second ring-shaped wall is to absorb vibration of the shaft, the second ring-shaped wall having s a second through hole;
   the damper comprising a plurality of grooves formed into an outer circumferential surface of the second ring-shaped wall, each groove extending along the axis but not extending the entire length of the second ring-shaped wall in the axis, each groove having a triangular shape in a cross-section taken by a plane perpendicular to the axis.

2. The system of claim 1, wherein the damper comprises elastically deformable material.

3. The system of claim 2, wherein the damper comprises a rubber material.

4. The system of claim 2, wherein the first ring-shaped wall comprise a first flange radially outwardly extending from the first end thereof and a second flange radially outwardly extending from the second end thereof such that the first and second flanges generally oppose each other, wherein the bearing guide comprises a damper mounting portion on the outer circumference of the first ring-shaped wall between the first and second flanges.

5. The system of claim 4, wherein the first flange has an outer diameter larger than that of the damper mounting portion.

6. The system of claim 4, wherein the second ring-shaped wall surround the entire outer circumferential surface of the damper mounting portion.

7. The system of claim 4, wherein the damper mounting portion, the first flange and the second flange are integrally formed by injection molding.

8. The system of claim 1, wherein the bearing guide further comprises a plug blocking the second opening of the first ring-shaped wall such that the first ring-shaped wall and the plug in combination configured to receive a distal end portion of the shaft through the first opening while the second opening is blocked by the plug.

9. The system of claim 1, wherein the first ring-shaped wall comprises a notch formed into an inner surface thereof and elongated along the axis.

10. The system of claim 1, wherein the bearing guide further comprises a first flange radially outwardly extending from the first ring-shaped wall at the first end and a second flange radially outwardly extending from the first ring-shaped wall at the second end such that the first and second flanges generally oppose each other.

11. The system of claim 1, wherein the second ring-shaped wall extends in the axis between the first and second flanges of the first ring-shaped wall.

* * * * *